(No Model.)
W. P. PATTON.
PIPE COUPLING.
No. 318,790. Patented May 26, 1885.
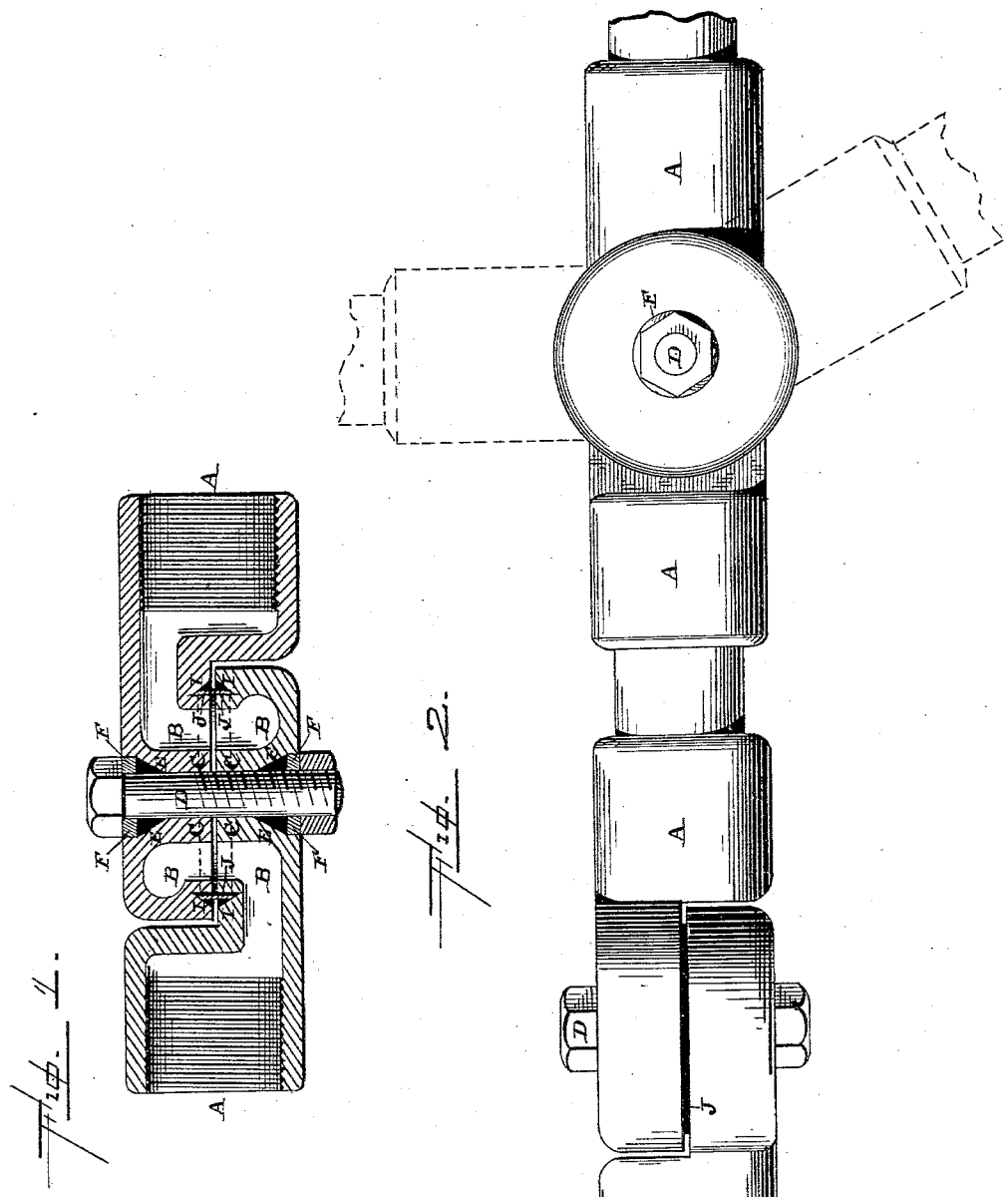
Witnesses.
Louis F. Gardner
J. E. Prosperi
Inventor.
W. P. Patton,
per
F. A. Lehmann,
atty.

UNITED STATES PATENT OFFICE.

WILLIAM P. PATTON, OF HARRISBURG, PENNSYLVANIA, ASSIGNOR OF ONE-HALF TO JAMES R. PIPER, OF SAME PLACE.

PIPE-COUPLING.

SPECIFICATION forming part of Letters Patent No. 318,790, dated May 26, 1885.

Application filed February 10, 1885. (No model.)

*To all whom it may concern:*

Be it known that I, WILLIAM P. PATTON, of Harrisburg, in the county of Dauphin and State of Pennsylvania, have invented certain new and useful Improvements in Pipe-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in pipe-couplings; and it consists in the combination of the two parts of the coupling, each of which is provided with a central boss and a triangular-shaped groove, with the bolt, suitable packings applied to its ends, and the ring which is placed in the grooves, as will be more fully described hereinafter.

The object of my invention is to produce a coupling which is simple and cheap in construction, easily applied to metal pipes, and which will allow the pipes to be freely turned in any direction.

Figure 1 is a vertical section of a coupling embodying my invention. Fig. 2 is a plan view of two of the couplings placed close together.

A A represent the two parts of the coupling, both of which are cut away horizontally, as shown, so as to form flat bearing-surfaces where they are applied together, and each one is cored out so as to form the annular chamber B. The central part, C, of each portion of the coupling forms a boss, which rises to the level of the bearing-face, and through which bosses passes the bolt D, by means of which the two parts of the coupling are secured together. In the outer side of each part of the coupling is formed a conical recess, E, in which is placed a suitable packing, and upon the top of the packing is placed a washer, F, which serves to force the packing tightly into the recess, so as to prevent any leakage at this point. Each time that the nut is tightened on the bolt the packings are tightened in place and the two parts of the coupling forced more tightly together. The two bosses contract the openings through the coupling, but serve to brace and strengthen it and form a more solid and rigid bearing for the bolt.

In between the bearing-faces of the two parts of the coupling may be placed any suitable kind of packing, which, when the parts are tightened together, serves to help prevent leakage at this point.

In the bearing-face of each part of the coupling is formed an annular groove, I, and in these grooves is placed a ring, J, as shown. The edges of this ring are beveled upon their outer sides, so as to correspond to the shape of the grooves, which are made preferably triangular in cross-section. The ring is made of any suitable material that is slightly elastic; but seamless brass tubing is preferred. The pressure of the two parts of the coupling when they are forced together causes a perfect contact or joint to be made between the edges of the ring and the inclined sides of the grooves, thus forming a perfectly safe steam or water joint. When the bolt is tightened properly by means of the nut on its end, there is a uniform bearing against the beveled walls of the grooves by the edges of the ring, and a tight joint is produced without any grinding or other preparation than the ordinary operations of the turning-lathe. A heavy internal pressure from either water or steam in the pipes causes the edges of the ring to be forced more tightly against the sides of the grooves, and thus a tighter joint to be formed. Where a flexible metal pipe is needed, two or more of the couplings are placed near together, the couplings being turned so that the bolts stand at right angles to each other, and then the ends of the pipes can be turned freely in any direction.

Having thus described my invention, I claim—

The combination of the two parts of the coupling, each of which is provided with a central boss and a triangular-shaped groove, with the bolt, suitable packings applied to its ends, and the ring which is placed in the grooves, substantially as specified.

In testimony whereof I affix my signature in presence of two witnesses.

WILLIAM P. PATTON.

Witnesses:
ED. M. COOPER,
STEWART P. KEELING.